F. P. HUFFMAN.
CHICKEN BROODER.
APPLICATION FILED JULY 10, 1908.
911,990.
Patented Feb. 9, 1909.
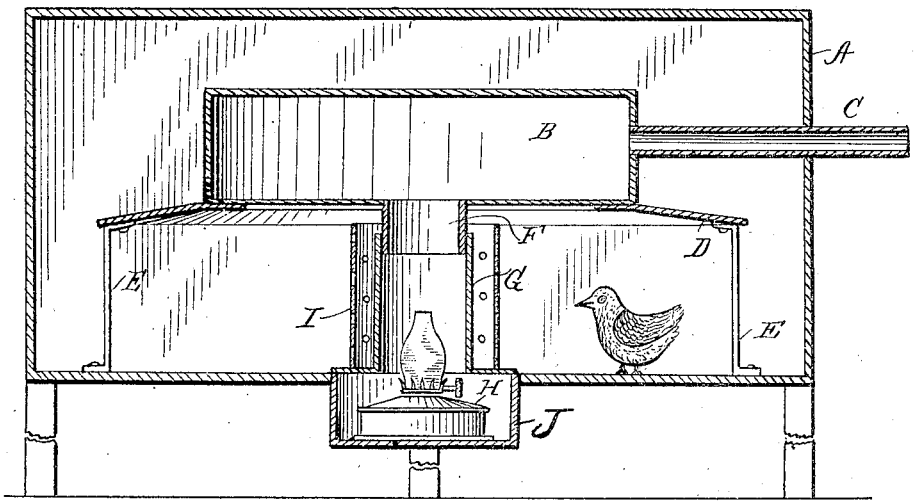
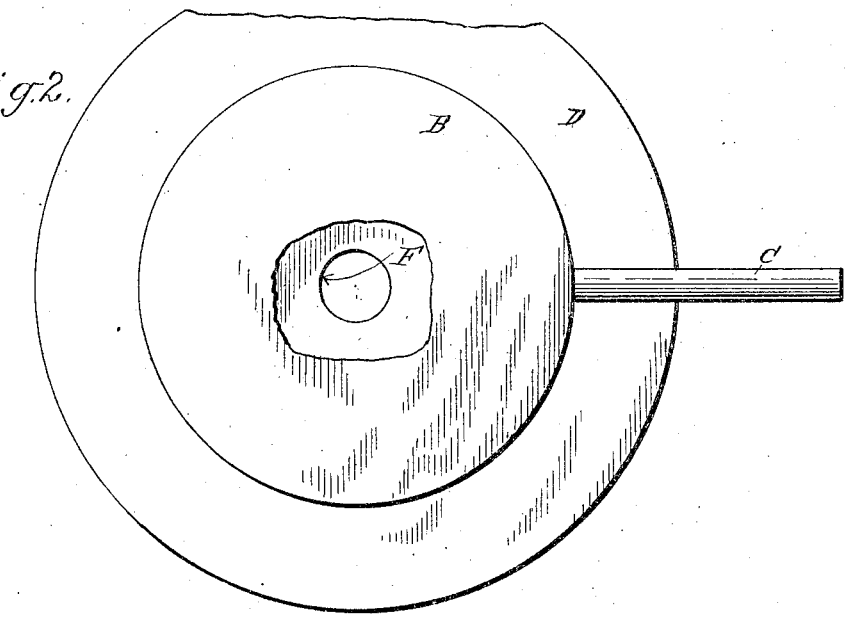
Witnesses
L. E. Barkley.
L. A. Sands.
Inventor
Frank P. Huffman
By
Attorney

UNITED STATES PATENT OFFICE.

FRANK P. HUFFMAN, OF NEAR LEBANON, OHIO.

CHICKEN-BROODER.

No. 911,990.　　　　Specification of Letters Patent.　　　Patented Feb. 9, 1909.

Application filed July 10, 1908. Serial No. 442,971.

*To all whom it may concern:*

Be it known that I, FRANK P. HUFFMAN, a citizen of the United States of America, residing near Lebanon, in the county of Warren and State of Ohio, have invented certain new and useful Improvements in Chicken-Brooders, of which the following is a specification.

This invention relates to the care of live stock and particularly to chicken brooders.

An object of this invention is to provide a brooder having a heating drum suspended above the runway for the chickens, the said drum having an extension cover under which the chickens may move, said cover being provided with legs by which the heating drum is supported.

A further object of this invention is to provide a heating drum with means for directing the products of combustion from a lamp or the like heat producing agent, the said drum being provided with a draft pipe by which the products of combustion and fumes are carried off in order that the air in the brooder may not become contaminated.

A still further object of this invention is to provide novel means for guarding the pipe leading to the drum in order that the chickens may not come in contact with the heated pipe and I prefer that this protecting device shall be made of metal and that it be perforated to permit circulation of air around the pipe leading to the heating drum.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, in which—

Figure 1, is a vertical sectional view of a brooder embodying the invention; and Fig. 2, is a top plan view of the drum, the central portion being broken away; Fig. 3, is a sectional view taken through the nipple of the drum, heat conducting pipe and the guard shown in Fig. 1, the lamp chimney being omitted from the interior of the heat conducting pipe.

In these drawings A, denotes a coop or inclosure and B, is a drum therein preferably circular, although its configuration is an immaterial detail of construction. The drum is provided with a draft pipe C, extending from its side and leading through the side of the closure or coop A, and said pipe is free to discharge to the atmosphere outside of the coop. The drum is provided with a flange D, extending from its lower edge and said flange acts as a cover for the chickens in the coop. The flange is supported by the legs E, resting on the bottom of the coop and it is through the medium of the legs that the drum is supported. The drum has a depending nipple F, to which a pipe G, is connected and said pipe, at its lower end, contains a lamp H, by which heat is supplied to the drum, that is to say the heat from the lamp passes through the pipe G, and circulates through the heating drum and is discharged through the draft pipe C. As shown in the drawings the pipe G, communicates through the bottom of the coop or inclosure of the brooder with a lamp casing J, and the lamp is accessible through the side of the casing in any ordinary manner.

A guard I, surounds the pipe G, and said guard is in the form of a collar extending from the floor of the coop a suitable distance up the pipe G. The object of the guard is to prevent the chickens from coming in contact with the heated pipe G, and while it will probably not be necessary to have the guard I, extend from the floor to the bottom of the drum, it must be of such height as to prevent the young chickens from getting to the top thereof for if the chickens were able to jump or otherwise gain access to the top of the guard, the purpose and object of the guard would be defeated.

In using this brooder, it is my purpose to have the height of the legs such that when they support the flange and brooder that the said flange and brooder would be rather close to the chickens which are occupying the floor of the brooder and the heat from the drum will be confined to a greater or less extent by the flange, hence the amount of heat required will be minimized.

By constructing a brooder in accordance with this invention the conditions would approach the natural state in which chickens are protected.

I claim—

1. In a brooder, a closure, a heating drum therein, an annular flange secured to the bottom of the heating drum at the edge thereof, said flange being inclined from its point of connection with the drum to its outer edge, supports connected to the outer ends of the flange whereby the drum and flange are held in place, a nipple depending from the body of the drum, a pipe connected to the nipple a lamp casing from which said pipe leads and a guard connected to the lamp casing and extending upwardly to encircle the pipe.

2. In a brooder a casing, a drum therein, an annular flange secured to the bottom of the drum near the edge thereof, said flange extending outwardly and downwardly from the drum, means connected to the flange near its outer edge for supporting the flange and drum, a pipe connected to the drum for conducting heat thereto, and a pipe communicating with the drum and extending through the casing by which the said drum is in communication with the atmosphere.

In testimony whereof I affix my signature in the presence of two witnesses.

FRANK P. HUFFMAN.

Witnesses:
ALTON F. BROWN,
F. M. HAMILTON.